No. 807,536. PATENTED DEC. 19, 1905.
S. BERENS.
VEHICLE WHEEL.
APPLICATION FILED APR. 14, 1905.
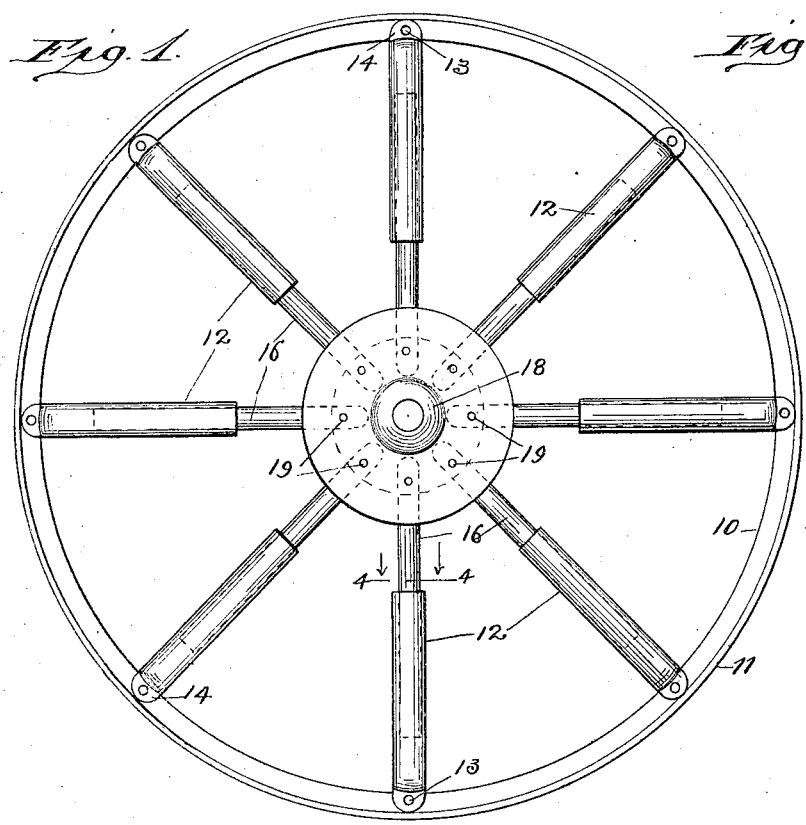
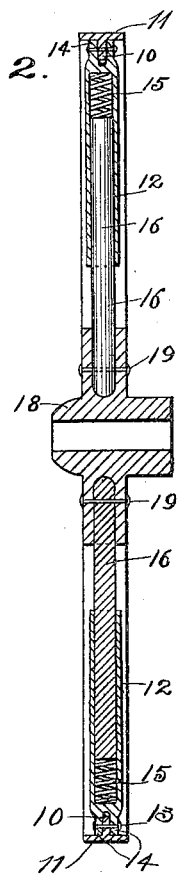
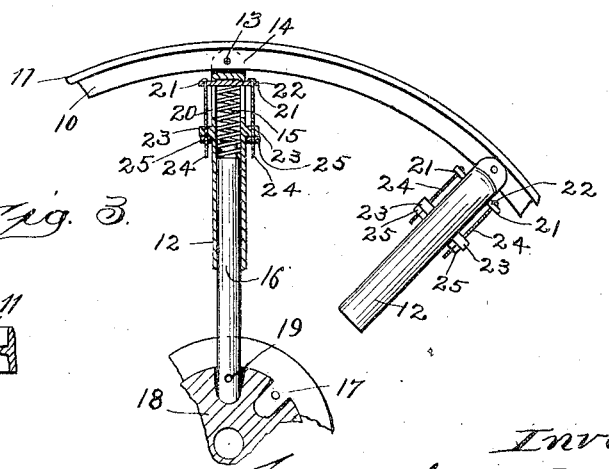
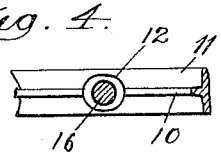

UNITED STATES PATENT OFFICE.

STANISLAUS BERENS, OF LAGRANGE, ILLINOIS.

VEHICLE-WHEEL.

No. 807,536.  Specification of Letters Patent.  Patented Dec. 19, 1905.

Application filed April 14, 1905. Serial No. 255,479.

*To all whom it may concern:*

Be it known that I, STANISLAUS BERENS, a citizen of the United States, residing at Lagrange, in the county of Cook and State of Illinois, have invented certain new and useful Improvements in Vehicle-Wheels, of which the following is a specification.

This invention relates to improvements in that class of wheels used on various kinds of vehicles—such as wagons, buggies, bicycles, automobiles, and the like; and it consists in certain peculiarities of the construction, novel arrangement, and operation of the various parts thereof, as will be hereinafter more fully set forth and specifically claimed.

The principal object of the invention is to provide a wheel which shall be simple and inexpensive in construction, strong, durable, and effective in operation, and so made as to furnish a yielding, springy, or cushioning effect to the axles or body of the vehicle similar to that afforded by a cushion or rubber tire, yet dispensing with the same.

Another object is to furnish simple and effective means for readily regulating the tension of the springs which press or support one of the series of sections comprising the spokes.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a view in side elevation of a wheel embodying one form of my invention. Fig. 2 is a transverse vertical sectional view thereof. Fig. 3 is a view, partly in section and partly in elevation, of a portion of the wheel, showing a modification in its construction; and Fig. 4 is a cross-sectional view, taken on line 4 4 of Fig. 1, looking in the direction indicated by the arrows.

Like numerals of reference refer to corresponding parts throughout the different views of the drawings.

The reference-numeral 10 indicates the felly or rim of the wheel, which may be provided with a plain metal tire 11, which in the present instance is shown as being integral with the rim or felly, but which may be otherwise secured thereon. Secured at their outer ends to the rim 10 are a series of radially and inwardly extending tubular pieces 12, each of which forms a portion of one of the spokes of the wheel. The outer end of each of the pieces 12 is movably secured to the rim 10 by means of a bolt or pin 13, which passes through openings in said pieces and the rim. In the drawings I have shown each of the pieces or tubes 12 as being provided at their outer ends with prongs 14, between which the rim 10 is extended; but this construction is not essential to the invention.

Located in each of the tubular pieces 12 and resting on the bottom of the cavity therein is a coiled spring 15, the other end of which is adapted to rest against one end of a rod 16, which fits loosely in said tube, and these rods form the other portions or sections of the spokes. The inner end of each of the rods 16 is fitted in a socket 17, a series of which is radially formed or provided in the hub. The inner ends of the rods or sections 16 are pivotally secured in their respective sockets in the hub 18 by means of pins 19, which pass through suitable openings in the hub and said rods. In order to permit a slight circumferential movement of the sections 12 and 16 with respect to one another, which becomes necessary by reason of the depression of the springs carried by the spokes on the lower portion of the wheel, each of the said tubes and sections 16 is pivoted on the rim and in the sockets of the hub, respectively.

In Fig. 3 of the drawings I have shown a modification in the construction of my wheel which consists in forming the outer portion of each of the tubular sections 12 with longitudinal slots 20 to receive the projecting ends 21 of a plate 22, which is movably located in each of the pieces 12 so that the outer ends of the springs 15 will rest thereon. Each of the tubes or sections 12 is also provided near said slots with lugs 23, one of which is located on each side of the tube in alinement with one of the slots. Located in openings in the projections 21 and lugs 23 are screw-threaded bolts 24, on the inner portions of which are located nuts 25 to be used for regulating the tension of the springs 15, which may be done by turning the nuts 25 in the proper direction so as to advance or retract the plate 22, against which one of the ends of the spring 15 rests, as above stated.

While I have shown the tubular portions as being secured to the rim of the wheel and the rods 16 as being secured to the hub, it is apparent that I may reverse the position of said parts and secure the rods to the rim and the tubes to the hub. It is also evident that instead of using a coiled spring I may employ a spring of rubber or other suitable material without departing from the spirit of my invention.

From the foregoing and by reference to the drawings it will be readily understood and clearly seen that by employing a wheel constructed according to my invention a yielding or cushion effect will be afforded and that as the sections 12 and 16 are pivoted at their ends to the rim and hub, respectively, the weight on the wheel will be uniformly distributed on the lower spokes.

Having thus fully described my invention, what I claim as new, and desire to secure by Letters Patent, is—

In a vehicle-wheel, the combination with a hub having a series of radial sockets, a series of rods secured in said sockets, a tubular section loosely surrounding each of the said rods at their outer portions, a spring located in each of the tubular sections between its outer end and the inner end of its rod, means on each of the tubular sections to regulate the tension of the spring therein, and a rim secured to the outer portions of the tubular sections, substantially as described.

STANISLAUS BERENS.

Witnesses:
CHAS. C. TILLMAN,
A. GUSTAFSON.